US010054059B2

(12) United States Patent
Schwarz et al.

(10) Patent No.: US 10,054,059 B2
(45) Date of Patent: Aug. 21, 2018

(54) NACELLE AND COMPRESSOR INLET ARRANGEMENTS

(71) Applicant: UNITED TECHNOLOGIES CORPORATION, Farmington, CT (US)

(72) Inventors: Frederick M. Schwarz, Glastonbury, CT (US); Robert E. Malecki, Storrs, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 464 days.

(21) Appl. No.: 14/824,292

(22) Filed: Aug. 12, 2015

(65) Prior Publication Data

US 2016/0076460 A1    Mar. 17, 2016

Related U.S. Application Data

(60) Provisional application No. 62/050,642, filed on Sep. 15, 2014.

(51) Int. Cl.
    *F02C 1/00*        (2006.01)
    *F02C 9/18*        (2006.01)
    (Continued)

(52) U.S. Cl.
    CPC ............... *F02C 9/18* (2013.01); *F01D 25/24* (2013.01); *F02C 3/04* (2013.01); *F02C 7/05* (2013.01);
    (Continued)

(58) Field of Classification Search
    CPC ...... F02C 7/05; F02C 7/052; B64D 2033/022; B64D 33/02; F05B 2260/63; F05B 2260/607
    See application file for complete search history.

(56) References Cited

U.S. PATENT DOCUMENTS

| | | | | | |
|---|---|---|---|---|---|
| 3,765,623 | A | * | 10/1973 | Donelson | ............... B64D 33/02 137/15.1 |
| 5,058,617 | A | * | 10/1991 | Stockman | ............ B64D 33/02 137/15.1 |

(Continued)

FOREIGN PATENT DOCUMENTS

GB        1557856 A       12/1979

OTHER PUBLICATIONS

European Search Report for Application No. 15185347.0-1607; dated Feb. 5, 2016.

*Primary Examiner* — Gerald L Sung
(74) *Attorney, Agent, or Firm* — Cantor Colburn LLP

(57) ABSTRACT

A gas turbine engine includes a nacelle defining a centerline axis and an annular splitter radially inward from the nacelle. A spinner is radially inward of the nacelle forward of a compressor section. A fan blade extends from a fan blade platform. A distance X is the axial distance from a first point to a second point, wherein the first point is defined on a leading edge of the annular splitter and the second point is defined on a leading edge of the fan blade where the fan blade meets the fan blade platform. A distance H is the radial distance from the first point to the second point. The relative position of the first point and the second point is governed by the ratio of $$\frac{X}{H} \geq 1.5$$

for reducing foreign object debris (FOD) intake into the compressor section.

10 Claims, 4 Drawing Sheets

(51) Int. Cl.
  *F02K 3/06*   (2006.01)
  *F02C 7/05*   (2006.01)
  *F01D 25/24*  (2006.01)
  *F02C 3/04*   (2006.01)
  *F02C 7/36*   (2006.01)
  *B64D 33/02*  (2006.01)

(52) U.S. Cl.
  CPC .......... *F02C 7/36* (2013.01); *F02K 3/06* (2013.01); *B64D 2033/022* (2013.01); *F05D 2250/14* (2013.01); *F05D 2250/232* (2013.01); *F05D 2250/24* (2013.01)

(56) References Cited

U.S. PATENT DOCUMENTS

| | | | |
|---|---|---|---|
| 5,182,906 A | | 2/1993 | Gilchrist et al. |
| 5,369,954 A | * | 12/1994 | Stuart .................... B64D 29/00 |
| | | | 239/265.17 |
| 2003/0084936 A1 | * | 5/2003 | Surply ................... B64D 33/02 |
| | | | 137/15.1 |
| 2006/0056977 A1 | * | 3/2006 | Ramstein ............... F02C 7/042 |
| | | | 416/245 R |
| 2012/0171018 A1 | * | 7/2012 | Hasel ...................... F02C 3/107 |
| | | | 415/122.1 |
| 2013/0004301 A1 | * | 1/2013 | Strock ................. C23C 28/3215 |
| | | | 415/174.4 |
| 2013/0011266 A1 | | 1/2013 | Gallagher et al. |
| 2016/0333734 A1 | * | 11/2016 | Bowden ................. B64C 11/14 |
| 2017/0106991 A1 | * | 4/2017 | Clark ..................... B64D 33/02 |

* cited by examiner

NACELLE AND COMPRESSOR INLET ARRANGEMENTS

CROSS-REFERENCE TO RELATED APPLICATIONS

This applications claims the benefit of U.S. Provisional Patent Application No. 62/050,642, filed Sep. 15, 2014, the contents of which are incorporated herein by reference in their entirety.

BACKGROUND OF THE INVENTION

1. Field of the Invention

The present disclosure relates to gas turbine engines, and more particularly to nacelle and compressor inlets for geared turbofan engines, for example.

2. Description of Related Art

A gas turbine engine typically includes a compressor section, a combustor section, and a turbine section. In the case of a turbofan, the engine also includes a fan section. Air entering the compressor section is compressed and delivered into the combustor section where it is mixed with fuel and ignited to generate a high-speed exhaust gas flow. The high-speed exhaust gas flow expands through the turbine to drive the compressor and the fan.

The fan section drives air through a bypass duct. The ratio of flow through the bypass duct versus through the compressor and turbine is called the bypass ratio. To improve overall engine performance, there is a trend toward larger and larger bypass ratios. For example, in a geared turbo fan engine, a gearing system is used to connect the driving shaft to the fan, so the fan can rotate at a different speed from the turbine driving the fan. One aspect of this type of engine is a larger bypass ratio than previous turbofan engines, resulting in reduced loses and less noise. One way to increase the bypass ratio is to increase the diameter of the fan section inlet, e.g. the nacelle inlet. This increase in diameter tends to increase the amount of foreign object debris (FOD) that is drawn into the fan section along with the air. While some FOD is diverted through the bypass duct, other FOD can enter into the compressor section and into the core of the engine.

Such conventional methods and systems have generally been considered satisfactory for their intended purpose. However, there is a continuous need in the art for improved gas turbine engines.

SUMMARY OF THE INVENTION

A gas turbine engine includes a nacelle defining a centerline axis. The nacelle includes a nacelle inlet, a nacelle outlet aft of the nacelle inlet and a bypass duct therebetween. The gas turbine engine also includes a compressor section aft of the nacelle inlet, an annular splitter, a spinner, a fan blade platform, and a fan blade. The annular splitter separates the bypass duct from the compressor section. The spinner is radially inward of the nacelle forward of the compressor section. The fan blade platform is defined in a fan section aft of the spinner and radially inward of the nacelle. The fan blade extends from the fan blade platform toward the nacelle. A distance X is the axial distance from a first point to a second point, wherein the first point is defined on a leading edge of the annular splitter and the second point is defined on a leading edge of the fan blade where the fan blade meets the fan blade platform. A distance H is the radial distance from the first point to the second point. The relative position of the first point and the second point is governed by the ratio of $$\frac{X}{H} \geq 1.5$$

for reducing foreign object debris (FOD) intake into the compressor section. The centerline axis and the first and second points can be defined in the same cross-sectional plane.

It is contemplated that the ratio $$\frac{X}{H}$$

can be in the range of $$1.5 \leq \frac{X}{H} \leq 4.0.$$

A distance r can be defined radially from the centerline axis to the leading edge of the annular splitter. An average distance $R_{avg}$ can be defined radially from the centerline axis to a leading edge of the nacelle inlet taken over a section of the nacelle ranging from a first circumferential position to a second circumferential position, wherein $$0.245 \leq \frac{\text{distance } r}{\text{average distance } R_{avg}} \leq 0.325$$

for reducing FOD intake into the compressor section. The first position can be defined on the leading edge of the nacelle inlet at a 3 o'clock position and the second position can be defined on an opposing side of the leading edge of the nacelle at a 9 o'clock position. The nacelle can include a bottom, wherein the bottom is configured to range from 14 to 66 inches off of the ground. The bypass duct and the compressor section can define a bypass ratio ranging from 10 to 16.

A point Z can be defined at an intersection of the centerline axis and a line C normal to the centerline axis extending radially inward from the leading edge of the fan blade where the fan blade meets the fan blade platform. A point W can be defined at the intersection of the line C and the leading edge of the fan blade where the fan blade meets the fan blade platform. A distance L can be defined from the point Z to a tip of the spinner. A point V can be defined along the centerline axis at a distance 0.25× the distance L aft of the tip of the spinner. A point U can be defined at an intersection of a line E normal to the centerline axis extending radially outward from the point V and a line F extending from the point W to the tip of the spinner. A point T can be defined at an intersection of the line E and the outer surface of the spinner. A distance $M_c$ can be defined from the point T to the point U. A distance $M_p$ can be defined from the point T to the point V. The spinner can be a substantially conical spinner wherein a ratio of the distance $M_p$ to the distance $M_c$ is less than or equal to 2. It is also contemplated that the spinner can be a substantially elliptical spinner wherein the ratio of the distance $M_p$ to the distance $M_c$ can be greater or equal to 2. Lines E, F and C, and centerline axis A can be defined in the same cross-sectional plane.

The gas turbine engine can also include a combustor section and a turbine section. The fan section, the compressor section, the combustor section and the turbine section can be configured to produce a static thrust ranging from 24,000 to 36,000 pounds. The fan section can also include a geared fan.

These and other features of the systems and methods of the subject invention will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein.

DETAILED DESCRIPTION OF THE PREFERRED EMBODIMENTS

Figure 1:
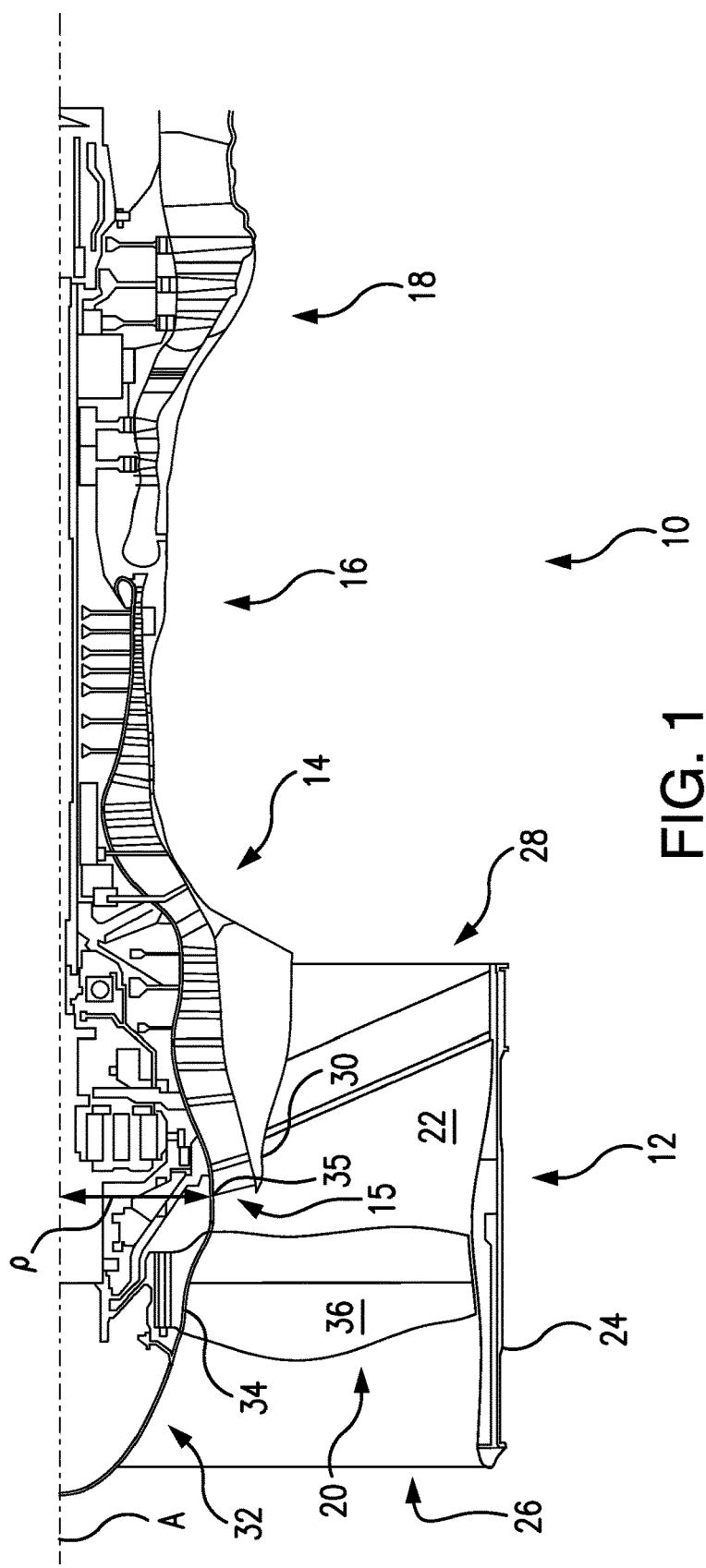
FIG. 1 is a schematic cross-sectional side elevation view of an exemplary embodiment of the lower portion of a gas turbine engine constructed in accordance with the present disclosure, showing the fan section, compressor section, combustor section and turbine section.

Reference will now be made to the drawings wherein like reference numerals identify similar structural features or aspects of the subject disclosure. For purposes of explanation and illustration, and not limitation, a partial view of an exemplary embodiment of a gas turbine engine in accordance with the disclosure is shown in FIG. 1 and is designated generally by reference character 10. Other embodiments of gas turbine engines in accordance with the disclosure, or aspects thereof, are provided in FIGS. 2-5, as will be described. The systems and methods described herein can be used to reduce foreign object debris (FOD) intake into the compressor section of the engine, for example.

As shown in FIG. 1, a gas turbine engine 10 is a turbofan, and includes a geared fan section 12, a compressor section 14, a combustor section 16 and a turbine section 18. Fan section 12 includes a fan 20. Fan 20 drives air through compressor section 14, however a large portion of the air from fan 20 passes through a bypass duct 22 to provide thrust without passing through compressor section 14, combustor section 16 or turbine section 18. Gas turbine engine 10 includes a nacelle 24 defining a centerline axis A and surrounding fan section 12. Nacelle 24 includes a nacelle inlet 26 and a nacelle outlet 28 aft of nacelle inlet 26. The lower half of gas turbine engine 10 is being shown, e.g. the half closest to the ground. Bypass duct 22 is defined between nacelle inlet 26 and nacelle outlet 28. Various other aspects of gas turbine engines not explained herein are readily appreciated by those skilled in the art. Bypass duct 22 and compressor section 14 define a bypass ratio ranging from 10 to 16. Fan section 12, compressor section 14, combustor section 16 and turbine section 18 are configured to produce a static thrust ranging from 24,000 to 36,000 pounds. Those skilled in the art will readily appreciate that gas turbine engine 10 can be used on a variety of aircraft, for example, a single aisle aircraft.

With continued reference to FIG. 1, gas turbine engine 10 also includes an annular splitter 30, an elliptical spinner 32, a fan blade platform 34, and a fan blade 36. Annular splitter 30 separates bypass duct 22 from compressor section 14. Compressor section 14 includes an inlet 15. Spinner 32 is radially inward of nacelle 24 and forward of compressor section 14. Fan blade platform 34 is defined in fan section 12 aft of spinner 32 and radially inward of nacelle 24. Fan blade 36 extends from fan blade platform 34 toward nacelle 24. A distance p measures from centerline axis A to a root 35 of the first compressor vane.

Figure 2:
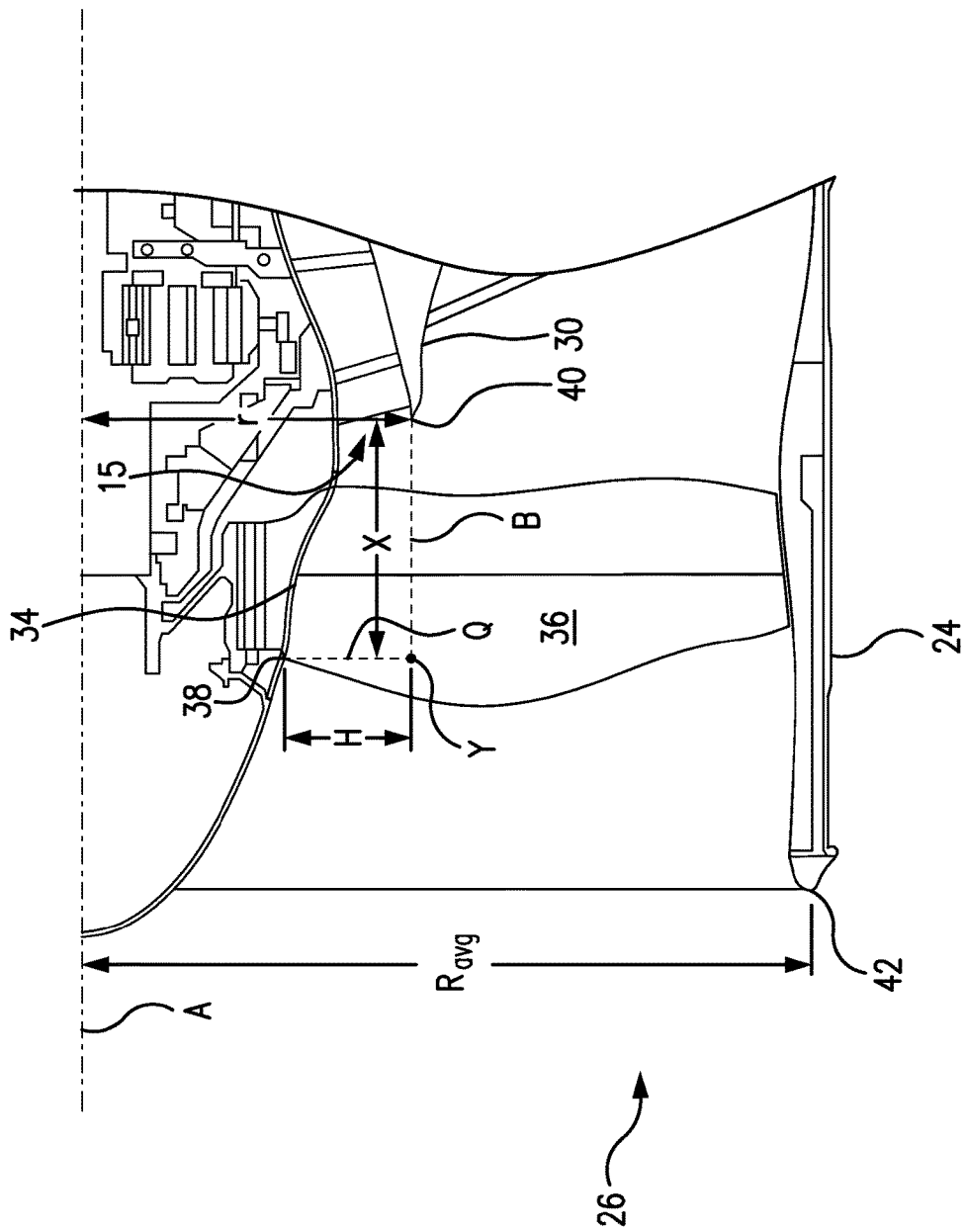
FIG. 2 is an enlarged schematic cross-sectional side elevation view of the portion of the gas turbine engine of FIG. 1, showing the inlet of the compressor section, the splitter and the leading edge of the nacelle.

With reference now to FIG. 2, a point Y is defined at an intersection of a line Q normal to centerline axis A extending radially from a leading edge 38 of fan blade 36 where fan blade 36 meets fan blade platform 34, e.g. the root, and a line B parallel to and radially outward of centerline axis A extending axially forward of a leading edge 40 of annular splitter 30. A distance X is defined from point Y to the leading edge of annular splitter 30. A distance H is defined from point Y to leading edge 38 of fan blade 36. A ratio of $$\frac{X}{H}$$

is greater than or equal to 1.5 and is configured to reduce FOD intake into compressor section 14. Point Y, line Q, line B and centerline axis A are all defined in the same cross-sectional plane. Generally, in traditional turbine engines, the larger the fan diameter is, the less ground clearance there is and the more FOD intake and damage there tends to be. By increasing distance X, either by moving inlet 14 farther aft of blade 36 or by maximizing the chord dimension of fan blade 36, FOD intake into inlet 15 of compressor section 14 is reduced. By reducing FOD intake, the diameter of fan section 12 for gas turbine engine 10 is better maximized for the available under wing area, thereby maximizing fuel burn, while reducing noise. While the ratio of $$\frac{X}{H}$$

is described above as being greater than 1.5, those skilled in the art will readily appreciate that $$\frac{X}{H}$$

can preferably range from 1.5 to 4.0, or even more preferably range from 2.0 to 4.0.

Figure 3:
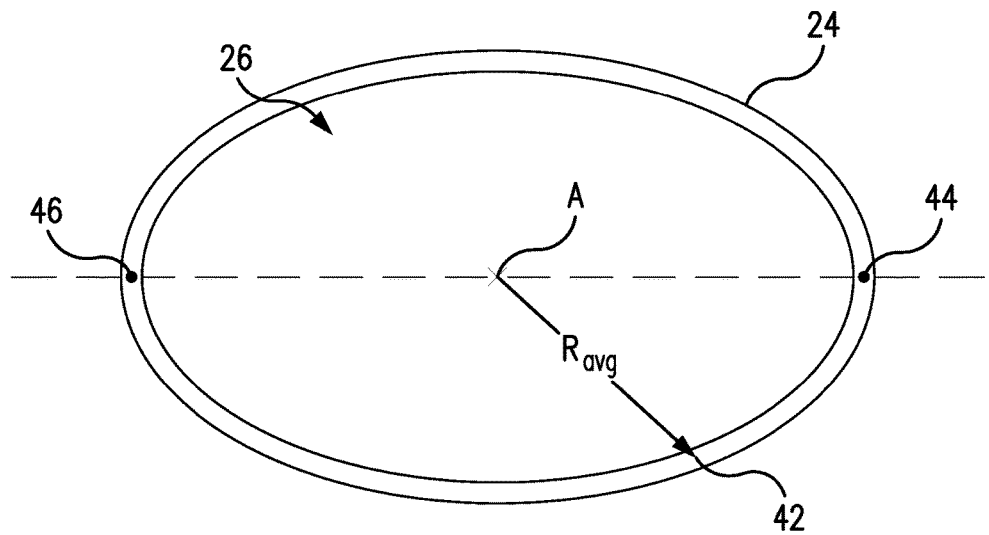
FIG. 3 is a schematic front view of the nacelle of FIG. 2, showing the range over which $R_{avg}$ is calculated.

With reference now to FIGS. 2 and 3, a distance r is defined radially from centerline axis A to leading edge 40 of annular splitter 30. An average distance $R_{avg}$ is defined radially from centerline axis A to a leading edge 42 of nacelle inlet 26 taken over a section of nacelle 24 ranging from a first position 44 to a second position 46, wherein $$0.245 \le \frac{\text{distance } r}{\text{average distance } R_{avg}} \le 0.325$$

for reducing FOD intake into the compressor section. First position 44 is defined on leading edge 42 of nacelle inlet 26 at a 3 o'clock position and second position 46 is defined on an opposing side of leading edge 42 of nacelle inlet 26 at a 9 o'clock position. In other words, the portion of nacelle 24 from first position 44 and second position 46 is the lower half of the nacelle inlet 26 closest to the ground. By lowering the $$\frac{r}{R_{avg}}$$

ratio, the size of compressor section inlet 14, as compared to nacelle inlet 26, is reduced, thereby reducing the likelihood that FOD entering fan section 12 will enter into compressor section 14.

Figure 4:
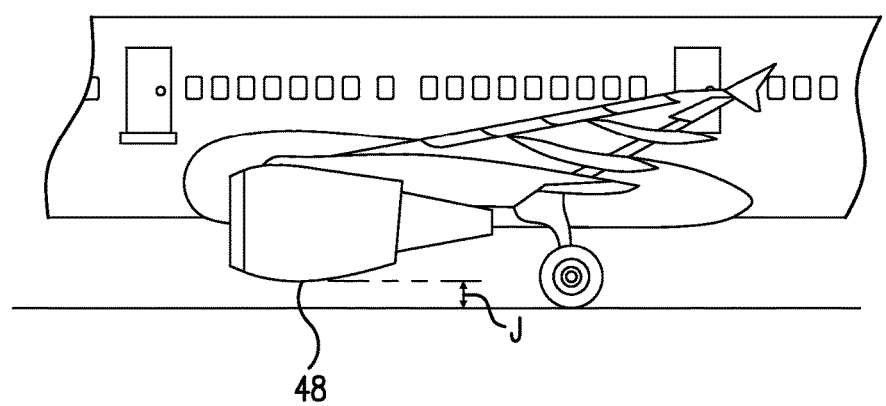
FIG. 4 is a schematic side view of the gas turbine engine of FIG. 1 mounted on a wing of an aircraft, showing the bottom of the nacelle and the clearance from the bottom of the nacelle to the ground.

As shown in FIG. 4, gas turbine engine 10 is mounted to an aircraft wing. Nacelle 24 includes a bottom 48. A clearance J below the bottom 48 of nacelle 24 is configured to range from 14 to 66 inches off of the ground when nacelle 24 is mounted to an aircraft wing.

Figure 5:
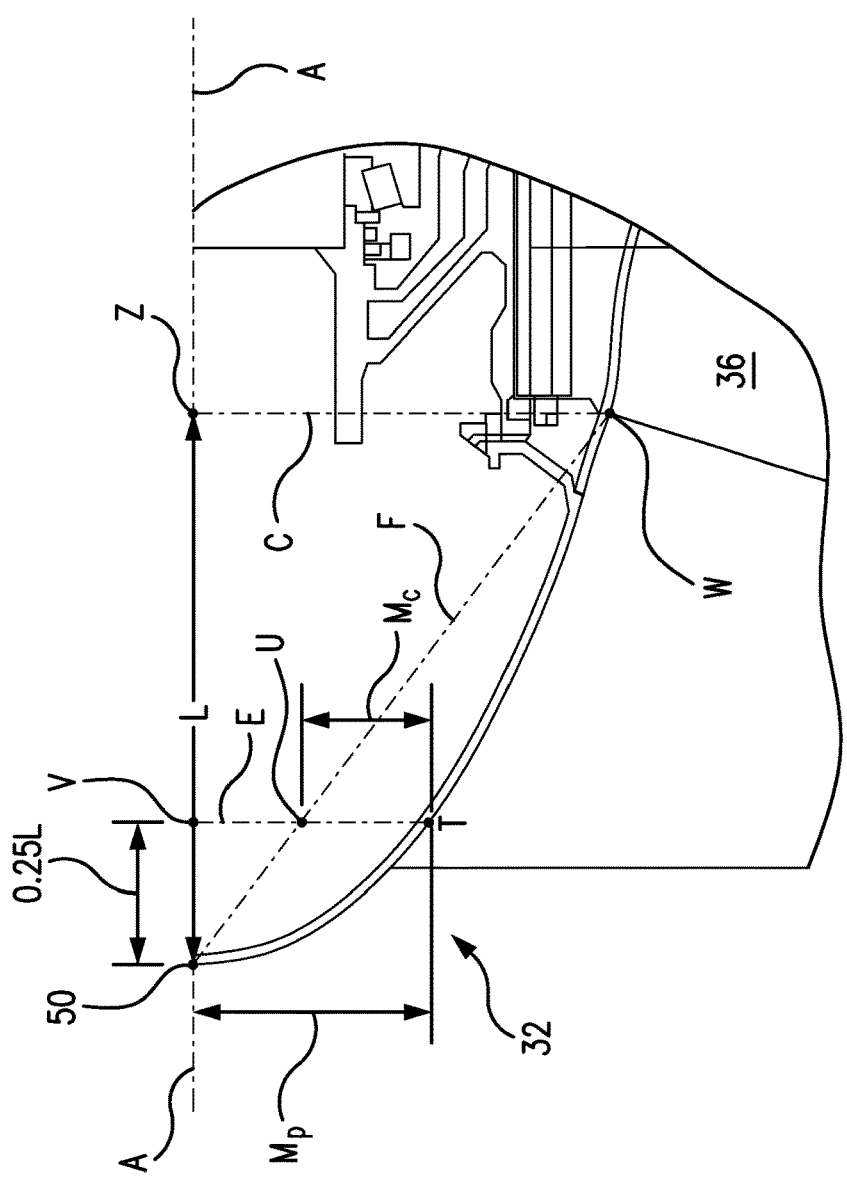
FIG. 5 is an enlarged schematic cross-sectional side elevation view of the portion of the gas turbine engine of FIG. 1, showing the elliptical spinner and a leading edge of the fan blade where the fan blade meets the fan blade platform.

Now with reference to FIG. 5, a point Z is defined at an intersection of centerline axis A and a line C normal to centerline axis A extending radially inward from leading edge 38 of fan blade 36. A point W is defined at the intersection of line C and leading edge 38 of fan blade 36. A distance L is defined from point Z to a tip 50 of elliptical spinner 32. A point V is defined along centerline axis A at a distance 0.25 times distance L aft of tip 50 of spinner 32. A point U is defined at an intersection of a line E normal to centerline axis A extending radially outward from point V and a line F extending from point W to the tip of spinner 32. A point T is defined at an intersection of line E and the outer surface of spinner 32. A distance $M_c$ is defined from point T to point U. A distance $M_p$ is defined from point T to point V. For substantially elliptical spinner 32, the ratio of the distance $M_p$ to the distance $M_c$ is greater or equal to 2. Those skilled in the art will readily appreciate that while spinners 32 with a substantially elliptical shape tend to deflect FOD from compressor section inlet 14 more effectively than spinners 32 with a substantially conical shape, described below, they tend to have increased drag, resulting in lower total pressure recovery going to the root of fan blade 36. Lines E, F and C, and centerline axis A are defined in the same cross-sectional plane.

Figure 6:
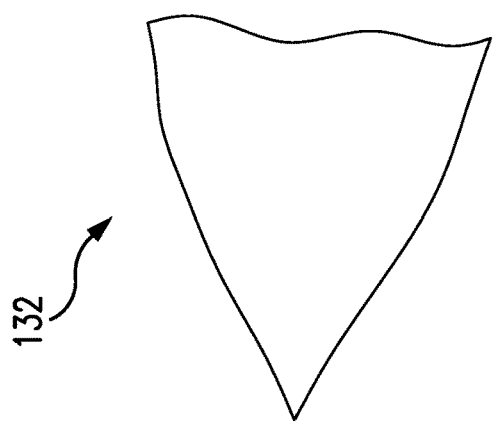
FIG. 6 is a schematic cross-sectional side elevation view of a portion of another exemplary embodiment of a spinner constructed in accordance with the present invention, showing a conical spinner.

As shown in FIG. 6, it is also contemplated that the spinner can be a substantially conical spinner 132 wherein a ratio of the distance $M_p$ to the distance $M_c$ is less than or equal to 2. Those skilled in the art will readily appreciate that while spinners 132 with a substantially conical shape tend to deflect FOD from a compressor section inlet less effectively than spinners 32 with a substantially elliptical shape, described above, they tend to have reduced drag, and can be contoured, resulting in increased efficiency in a smoother transition of air into to the root of a fan blade, e.g. fan blade 36.

The methods and systems of the present disclosure, as described above and shown in the drawings, provide for gas turbine engines with superior properties including improved FOD resistance. While the apparatus and methods of the subject disclosure have been shown and described with reference to preferred embodiments, those skilled in the art will readily appreciate that changes and/or modifications may be made thereto without departing from the scope of the subject disclosure.

What is claimed is:

1. A gas turbine engine comprising:
   a nacelle, the nacelle including:
   i. a nacelle inlet;
   ii. a nacelle outlet aft of the nacelle inlet; and
   iii. a bypass duct therebetween;
   a compressor section aft of the nacelle inlet;
   an annular splitter separating the bypass duct from the compressor section;
   a spinner radially inward of the nacelle forward of the compressor section;
   a fan blade platform defined in a fan section aft of the spinner and radially inward of the nacelle; and
   a fan blade extending from the fan blade platform toward the nacelle,
   wherein a distance X is the axial distance from a first point to a second point, wherein the first point is defined on a leading edge of the annular splitter and the second point is defined on a leading edge of the fan blade where the fan blade meets the fan blade platform, and wherein a distance H is the radial distance from the first point to the second point, wherein $$1.5 \le \frac{\text{distance } X}{\text{distance } H} \le 4$$

for reducing foreign object debris (FOD) intake into the compressor section; and
wherein a point Z is defined at an intersection of the centerline axis and a line C normal to the centerline axis extending radially inward from the leading edge of the fan blade where the fan blade meets the fan blade platform, wherein a point W is defined at the intersection of the line C and the leading edge of the fan blade where the fan blade meets the fan blade platform, a distance L is defined from the point Z to a tip of the spinner, wherein a point V is defined along the centerline axis at a distance 0.25 times the distance L aft of the tip of the spinner, wherein a point U is defined at an intersection of a line E normal to the centerline axis extending radially outward from the point V and a line F extending from the point W to the tip of the spinner, wherein a distance $M_c$ is defined from the point T to the point U, and wherein a distance $M_p$ is defined from the point T to the point V, wherein $$\frac{\text{distance } Mc}{\text{distance } Mp} \le 1/2.$$

2. A gas turbine as recited in claim 1, wherein a distance r is defined radially from the centerline axis to the first point, and an average distance $r_{avg}$ is defined radially from the centerline axis to a leading edge of the nacelle inlet taken over a section of the nacelle ranging from a first position to a second position, wherein $$0.245 \leq \frac{\text{distance } r}{\text{average distance } R_{avg}} \leq 0.325.$$

3. A gas turbine engine as recited in claim 2, wherein the first position is defined on the leading edge of the nacelle inlet at a 3 o'clock position and the second position is defined on an opposing side of the leading edge of the nacelle at a 9 o'clock position.

4. A gas turbine engine as recited in claim 1, wherein the bypass duct and the compressor section define a bypass ratio ranging from 10 to 16.

5. A gas turbine engine as recited in claim 1, further comprising a combustor section and a turbine section wherein the fan section, the compressor section, the combustor section and the turbine section are configured to produce a thrust ranging from 24,000 to 36,000 pounds.

6. A gas turbine engine as recited in claim 1, further comprising a combustor section and a turbine section wherein the fan section, the compressor section, the combustor section and the turbine section are configured to produce a thrust ranging from 24,000 to 36,000 pounds and wherein the fan section includes a geared fan.

7. A gas turbine engine comprising:
   a nacelle defining a centerline axis, the nacelle including:
   i. a nacelle inlet;
   ii. a nacelle outlet aft of the nacelle inlet; and
   iii. a bypass duct therebetween;
   a compressor section aft of the nacelle inlet;
   a combustor section aft of the compressor section;
   a turbine section aft of the combustor section, wherein a fan section, the compressor section, the combustor section and the turbine section are configured to produce a thrust ranging from 24,000 to 36,000 pounds;
   an annular splitter separating the bypass duct from the compressor section;
   a spinner radially inward of the nacelle forward of the compressor section;
   a fan blade platform defined in the fan section aft of the spinner and radially inward of the nacelle; and
   a fan blade extending from the fan blade platform toward the nacelle,
   wherein a distance X is the axial distance from a first point to a second point, wherein the first point is defined on a leading edge of the annular splitter and the second point is defined on a leading edge of the fan blade where the fan blade meets the fan blade platform, and wherein a distance H is the radial distance from the first point to the second point, wherein $$1.5 \leq \frac{\text{distance } X}{\text{distance } H} \leq 4$$

for reducing foreign object debris (FOD) intake into the compressor section;
and wherein a distance r is defined radially from the centerline axis to the first point, and an average distance $R_{avg}$ is defined radially from the centerline axis to a leading edge of the nacelle inlet taken over a section of the nacelle ranging from a first position to a second position wherein $$0.245 \leq \frac{\text{distance } r}{\text{average distance } R_{avg}} \leq 0.325$$

Also for reducing FOD intake into the compressor section, and
wherein a point Z is defined at an intersection of the centerline axis and a line C normal to the centerline axis extending radially inward from the leading edge of the fan blade where the fan blade meets the fan blade platform, wherein a point W is defined at the intersection of the line C and the leading edge of the fan blade where the fan blade meets the fan blade platform, a distance L is defined from the point Z to a tip of the spinner, wherein a point V is defined along the centerline axis at a distance 0.25 times the distance L aft of the tip of the spinner, wherein a point U is defined at an intersection of a line E normal to the centerline axis extending radially outward from the point V and a line F extending from the point W to the tip of the spinner, wherein a distance $M_c$ is defined from the point T to the point U, and wherein a distance $M_p$ is defined from the point T to the point V, wherein $$\frac{\text{distance } Mc}{\text{distance } Mp} \leq 1/2.$$

8. A gas turbine engine as recited in claim 7, wherein the first position is defined on the leading edge of the nacelle inlet at a 3 o'clock position and the second position is defined on an opposing side of the leading edge of the nacelle at a 9 o'clock position.

9. A gas turbine engine as recited in claim 7, wherein the bypass duct and the compressor section define a bypass ratio ranging from 10 to 16.

10. A gas turbine engine as recited in claim 7, wherein the fan section includes a geared fan.

* * * * *